(No Model.)
F. THIEL & F. EHRHARDT.
ATTACHMENT FOR LAWN MOWERS.
No. 542,696. Patented July 16, 1895.
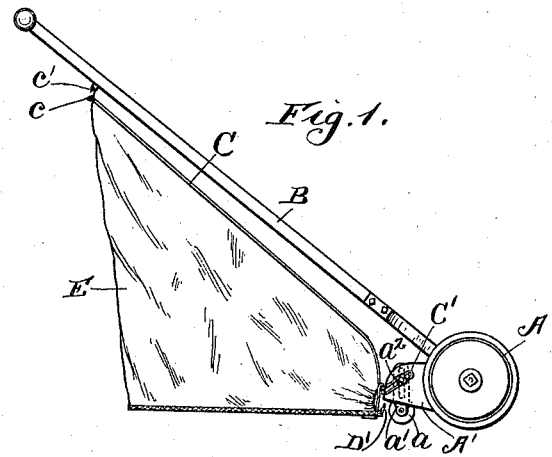
Fig. 1.
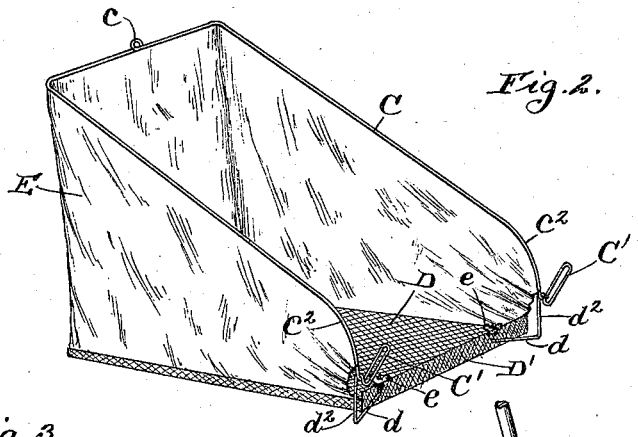
Fig. 2.
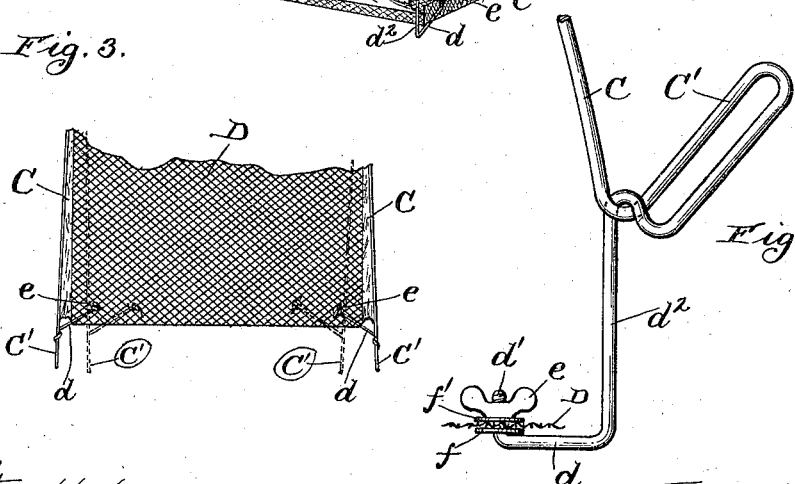
Fig. 3.
Fig. 4.
Witnesses:
R. J. Jacker,
B. T. Duggan.
Inventors:
Frederick Thiel & Frank Ehrhardt
By Chas. E. Tillman Atty.

UNITED STATES PATENT OFFICE.

FREDERICK THIEL AND FRANK EHRHARDT, OF CHICAGO, ILLINOIS.

ATTACHMENT FOR LAWN-MOWERS.

SPECIFICATION forming part of Letters Patent No. 542,696, dated July 16, 1895.

Application filed April 29, 1895. Serial No. 547,576. (No model.)

*To all whom it may concern:*

Be it known that we, FREDERICK THIEL and FRANK EHRHARDT, citizens of the United States, residing at Chicago, in the county of Cook and State of Illinois, have invented certain new and useful Improvements in Attachments for Lawn-Mowers, of which the following is a specification.

This invention relates to devices to be applied to lawn-mowers for the collection and carrying of the cut portions of grass, weeds, and the like; and it consists in certain peculiarities of the construction, novel arrangement, and operation of the various parts thereof, as will be hereinafter more fully set forth and specifically claimed.

The objects of our invention are, first, to provide an attachment for lawn-mowers adapted to receive and carry the cut-off portions of the grass, which shall be simple and inexpensive in construction, strong and durable, yet light and effective in operation; second, such an attachment or carrier for grass, which can be readily attached to or detached from the frame of the mower, and, third, such an attachment which may be adjusted to mowers of different widths or of varying sizes.

Still another object of our invention is to provide an attachment for the above-named purpose which shall be capable of being folded into a compact form, thus facilitating and saving expense in shipping.

In order to enable others skilled in the art to which our invention pertains to make and use the same, we will now proceed to describe it, referring to the accompanying drawings, in which—

Figure 1 is a side view of a mower, showing our attachment or carrier for the grass attached thereto and in position as it appears when ready for use. Fig. 2 is a perspective view of the attachment or carrier detached from the mower. Fig. 3 is a plan view of a portion of the front part of the attachment or carrier; and Fig. 4 is a side view of one of the front ends of the frame of the attachment, showing the method of adjustably securing the same to the mower and to the bottom of the carrier.

Similar letters refer to like parts throughout the different views of the drawings.

A represents a lawn-mower, which may be of the ordinary or any preferred kind, and as usual is provided with a handle-bar B, by means of which the mower is pushed over the lawn. The frame A' of the mower is provided in its rear portion with a roller $a$, which has its bearings in slotted bars $a'$, which are adjustably secured to the frame A' by means of bolts $a^2$, which pass through slots in the bars $a'$ and holes in the side pieces of the frame of the mower. These bolts may also be employed for adjustably securing the frame of the carrier or attachment to the mower-frame, as will be presently explained.

The attachment is composed of a supporting-frame C, which is preferably made of flexible material, usually wire, and is bent so that its sides may be substantially parallel with each other, as shown in Figs. 2 and 3 of the drawings. The rear portion of the frame C is provided with a loop $c$, through which may be passed an attaching device $c'$ for securing it to the handle-bar of the mower. It is obvious, however, that the loop $c$ may be omitted, and that the frame may be secured to the handle-bar in any desired manner.

The front parts of the attachment or carrier-frame or that portion thereof adjacent to the mower-frame are curved downward, as at $c^2$, and are then formed with elongated loops C', which loops are made by first bending the wire composing the frame forwardly and upwardly at an angle to the downturned portions $c^2$ and then back upon itself to about the curve formed by the upturned portion, when the wire is bent inwardly over and then downward or vertical, as is clearly shown in Fig. 4 of the darwings. The lower portion of each end of the wire composing the frame C of the carrier or attachment is formed with a horizontal arm $d$, the end of which is provided with an upturned screw-threaded part $d'$, to engage a set-screw $e$, which is used for adjustably securing the ends of the attachment or carrier-frame to the floor or bottom D of the carrier, which floor or bottom is preferably made of woven wire or of other material provided with perforations.

To the sides and rear edge of the bottom D is secured in any desired manner a fabric or other suitable material E, which is attached at its upper portion to the frame C of the carrier or attachment.

By reference to Fig. 3 of the drawings it will be seen and clearly understood that the horizontal portions $d$ of the downturned ends of the frame C are made at an angle to the vertical portions $d^2$ of said ends—that is to say, the horizontal parts $d$ are turned inwardly, so that the upturned ends $d'$ may be inserted through the meshes or perforations in the bottom D and retained in position by means of the set-screws $e$, which are placed on the projections $d'$ for said purpose.

In order to more securely and durably fasten the upturned portions $d'$ to the bottom, we place washers $f$ and $f'$ on the projections $d'$, one washer $f$ being located below the bottom D and the other $f'$ resting on the top thereof and the two clamped together by means of the set-screw. The front edge of the bottom D is formed with a turned-up part D', which lies adjacent to the roller $a$ on the mower and prevents the cut grass from falling or sliding out of the carrier. This upturned part D' also somewhat stiffens the bottom, which we usually make of flexible material and preferably of woven wire, as before stated. The loops C' of the carrier-frame are adapted to engage the bolts $a^2$ on the frame A' of the mower, and thereby enables the carrier or attachment to be adjusted relative to the roller $a'$ of the mower.

When it is desired to adjust the attachment to mowers of different sizes, it is apparent that the front portions of the frame C may be bent inwardly, as shown by dotted lines in Fig. 3 of the drawings, and secured in said positions to the bottom D by means of the projections $d'$, set-screws $e$, and the washers $f$ and $f'$, engaging with said bottom.

Having thus fully described our invention, what we claim as new, and desire to secure by Letters Patent, is—

1. The combination of a supporting frame, for the attachment or carrier, secured at its front part to the frame of the mower, and having at its ends horizontal arms and vertical projections to engage the bottom of the attachment, with said bottom having perforations therein, a piece uniting the bottom and supporting frame and forming a receptacle for the grass, and means to secure the ends of the frame to the bottom, substantially as described.

2. The combination of a supporting frame, for the attachment, provided at its front part with elongated loops to engage the frame of the mower, and horizontal and upturned parts to engage the floor of the attachment or carrier, with said floor having perforations therein, a piece uniting the floor and supporting frame and forming a receptacle for the grass, and means to secure the ends of the frame to the bottom or floor, substantially as described.

3. The combination of a supporting frame C, having the elongated loops C', at its front part to adjustably secure it to the frame of the mower, and having at its ends the horizontal arms $d$, and upturned screw-threaded projections $d'$, to engage the bottom of the attachment, the washers $f$, and $f'$, on the projections $d'$, and the set-screws $e$, to engage said projections, the bottom or floor D, having openings or perforations therein, and the piece E, uniting the supporting frame and bottom or floor, and forming a receptacle for the grass, substantially as described.

FREDERICK THIEL.
FRANK EHRHARDT.

Witnesses:
CHAS. C. TILLMAN,
E. A. DUGGAN.